United States Patent
Miya

(10) Patent No.: US 7,625,140 B2
(45) Date of Patent: Dec. 1, 2009

(54) LIGHT SHIELDING DEVICE OF A LENS

(75) Inventor: Kota Miya, Saitama (JP)

(73) Assignee: Hoya Corporation, Tokyo (JP)

( * ) Notice: Subject to any disclaimer, the term of this patent is extended or adjusted under 35 U.S.C. 154(b) by 426 days.

(21) Appl. No.: 11/566,798

(22) Filed: Dec. 5, 2006

(65) Prior Publication Data

US 2007/0127910 A1   Jun. 7, 2007

(30) Foreign Application Priority Data

Dec. 6, 2005   (JP)   ............... 2005/351433

(51) Int. Cl.
   *G03B 17/04*   (2006.01)
   *G03B 5/02*   (2006.01)
(52) U.S. Cl. .................. 396/349; 396/72; 359/601; 359/611
(58) Field of Classification Search .................. None
   See application file for complete search history.

(56) References Cited

U.S. PATENT DOCUMENTS

| | | | | |
|---|---|---|---|---|
| 5,699,200 A * | 12/1997 | Uno et al. | .................. | 359/700 |
| 5,946,532 A | 8/1999 | Ichinokawa | | |
| 6,024,457 A * | 2/2000 | Kawai et al. | ................ | 359/611 |
| 6,400,901 B2 * | 6/2002 | Akami et al. | ................ | 396/29 |
| 6,919,995 B2 | 7/2005 | Nomura et al. | | |
| 7,093,944 B2 | 8/2006 | Tanaka | | |
| 7,295,772 B2 * | 11/2007 | Makii | .......................... | 396/241 |
| 2001/0009611 A1 * | 7/2001 | Akami et al. | ................ | 396/29 |
| 2001/0048557 A1 | 12/2001 | Akami et al. | | |
| 2004/0070849 A1 * | 4/2004 | Tanaka | ....................... | 359/808 |

FOREIGN PATENT DOCUMENTS

JP   2001-337257   12/2001

* cited by examiner

*Primary Examiner*—Jay M Patidar
(74) *Attorney, Agent, or Firm*—Greenblum & Bernstein, P.L.C.

(57) ABSTRACT

A light shielding device of a lens includes a movable barrel; an outer member positioned around the movable barrel; and a light shield ring for preventing ambient light entering the lens through a clearance between the movable barrel and the outer member, the light shield ring having a center opening through which the movable barrel is movably fitted and a self-centering annular portion around the center opening. The self-centering annular portion is in contact with an outer surface of the movable barrel and is bent by, and along, the outer cylindrical surface of the movable barrel. The light shield ring is biased against an annular part of the outer member by a biasing member, so that the light shielding ring is movable in a radial direction when a radial force is applied to the light shielding ring via the movable barrel and the self-centering annular portion.

14 Claims, 6 Drawing Sheets

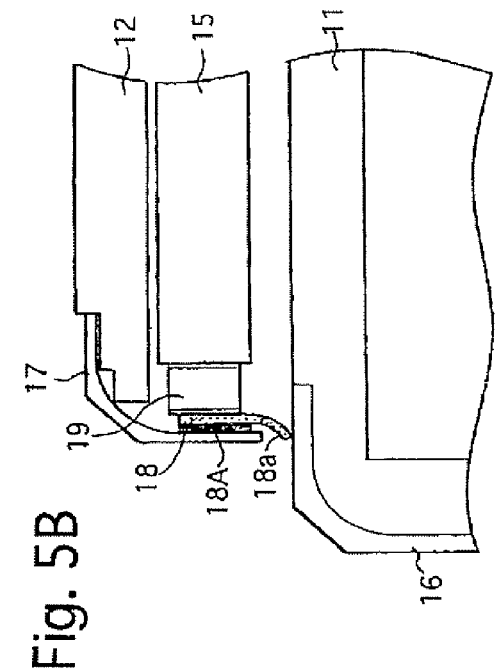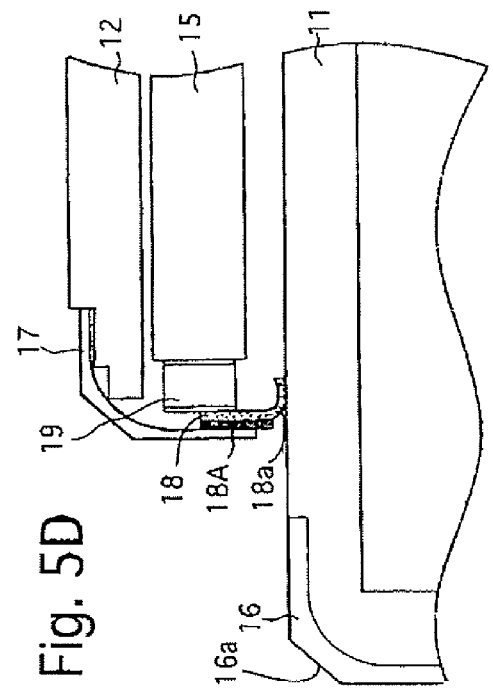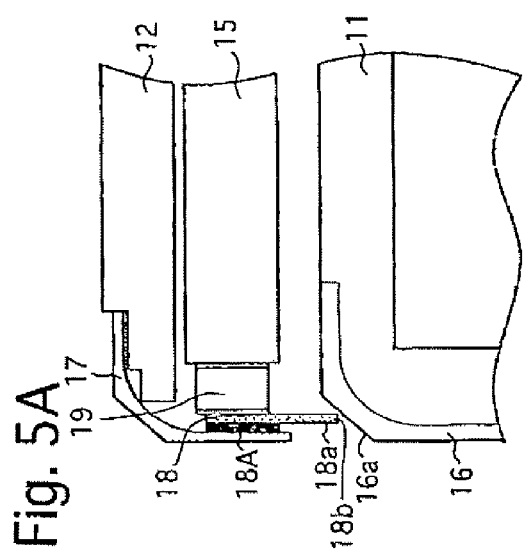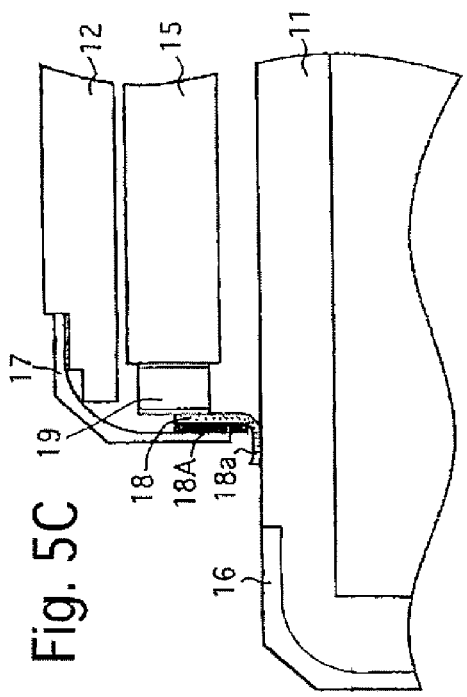

LIGHT SHIELDING DEVICE OF A LENS

BACKGROUND OF THE INVENTION

1. Field of the Invention

The present invention relates to a light shielding device, used for a lens (e.g., a photographic lens) including a lens barrel movable in an optical axis direction, for preventing ambient light from entering the lens through a clearance around the movable lens barrel.

2. Description of the Prior Art

In extendable lenses (e.g., retractable lenses or telescopic lenses) for cameras in which at least one movable lens barrel (movable barrel) is moved in an optical axis direction, a clearance must be secured between the movable lens barrel and an outer member (e.g., an outer barrel or a frame of a camera) provided around the movable lens barrel to allow a smooth advancing operation and a smooth retracting operation (these operations will be hereinafter collectively referred to as a lens advancing/retracting operation). Although providing the extendable lens with such a clearance prevents this interference from occurring and makes the smooth and swift advancing/retracting operation of the extendable lens possible, ambient light may enter inside the extendable lens through the clearance and reach a light receiving surface (e.g., a sensitive surface of film or an image pickup device) of the camera, thus interfering with proper picture taking.

To prevent such an entry of light, a light shielding device has been proposed. This conventional light shielding device is provided with a light shield ring made out of a sheet material of rubber, synthetic leather or the like, wherein a radially outer portion of the light shield ring is fixed to the aforementioned outer member by a fixing device such as an adhesive, while a radially inner portion of the light shield ring is made to be fitted on the outer peripheral surface of the movable lens barrel to prevent ambient light from entering the extendable lens through a clearance between the movable lens barrel and the outer member by the contact of the light shield ring with the outer peripheral surface of the movable lens barrel even if the movable lens barrel moves in the optical axis direction relative to the outer member. However, this sort of light shielding device requires a process of fixing the light shield ring, which is small in thickness and radial dimensions, to the outer member by a fixing member such as an adhesive so that the light shield ring is positioned coaxially with the movable lens barrel during assembly of the extendable lens. This troublesome process considerably impedes the assembling procedure of the extendable lens. Specifically, it is difficult to install the light shield ring coaxially with the movable lens barrel, so that the light shield ring is often installed eccentrically. This eccentric installation of the light shield ring deteriorates an original purpose of the light shield ring, i.e., the light-shielding ability of the light shield ring.

To prevent this from occurring, a technique of closing the clearance between the outer peripheral surface of the movable lens barrel and the outer member (an outer barrel or a frame of a camera) in a light-tight fashion by a similar light shield ring which is slidably fitted on the outer peripheral surface of the movable lens barrel has been proposed in Japanese Laid-Open Patent Publication (Kokai) No. 2001-337257. This technique can be advantageously used to facilitate the assembling procedure of the camera since the light shield ring only needs to be fitted on the outer peripheral surface of the movable lens barrel. Additionally, this technique advantageously prevents the light shield ring from becoming eccentric to the movable lens barrel since the light shield ring is fitted on the movable lens barrel to be held coaxially with the outer peripheral surface of the movable lens barrel.

In JLPP No. 2001-337257, the light shield ring needs to be held on the movable lens barrel with a required fitting force to maintain the fit between the light shield ring and the movable lens barrel because the light shield ring is inserted into a camera frame to be installed therein in a floating state Therefore, when the extendable lens operates by moving the movable lens barrel forward and rearward, the frictional force produced by the fit between the outer peripheral surface of the movable lens barrel and the light shield ring makes it difficult for the movable lens barrel to move smoothly and lightly, which causes an increased load on a lens driven mechanism thereof. If the fitting force of the light shield ring exerted on the movable lens barrel is weakened to prevent this problem from occurring, the light shield ring can be easily moved in radial directions relative to the movable lens barrel. Furthermore, the radially outer portion of the light shield ring is not fixed, and accordingly, the position of the light shield ring is not fixed inside of the camera frame. Therefore, the light shield ring easily becomes eccentric to the movable lens group. If the light shield ring becomes eccentric to the movable lens barrel, a circumferential portion of the radially outer portion of the light shield ring which is decentered radially outwards decreases in light-shielding ability and another circumferential portion of the radially outer portion of the light shield ring which is decentered radially inwards becomes easily pulled out by the lens advancing/retracting operation of the movable lens barrel. If the light shield ring is partly pulled out of the camera frame, the radially inner portion of the light shield ring is partly exposed to the outside of the camera frame along the outer peripheral surface of the movable lens barrel, which deteriorates the outward appearance of the camera. Although a stiffening ring is fixed to the radially outer portion of the light shield ring by a fixing device such as an adhesive to increase stiffness of the light shield ring in JLPP No. 2001-337257, it is difficult to prevent the light shield ring from being pulled out of the camera frame even by the installation of the stiffening ring because a radially inner portion of the light shield ring increases in fitting force exerted on the movable lens barrel to thereby make this portion easy to pull out of its initial position when the stiffening ring becomes eccentric. Additionally, although it is possible to increase the length of the camera frame in the optical axis direction to prevent the light shield ring from being exposed to the outside of the camera frame even if the light shield ring is pulled out of the camera body, an increase in length of the camera frame increases the thickness of the camera in the optical axis direction, which becomes an obstacle to a reduction in thickness and miniaturization of the camera.

SUMMARY OF THE INVENTION

The present invention provides a light shielding device used for a lens including a lens barrel movable in an optical axis direction, wherein the light shielding device prevents a light shield ring which is slidably fitted on the movable lens barrel from becoming eccentric to the movable lens barrel even if the fitting force of the light shield ring exerted on the movable lens barrel is weakened, and wherein the light shielding device automatically corrects eccentricity of the light shield ring even if the light shield ring becomes eccentric to the movable lens barrel, whereby the light shield ring is prevented from being pulled out by movements of the movable lens barrel, thus prevented from being exposed to the outside.

According to an aspect of the present invention, a light shielding device of a lens is provided, including a movable barrel which moves in an optical axis direction; an outer member positioned around the movable barrel; and a light shield ring for preventing ambient light from entering the lens through a clearance between the movable barrel and the outer member, the light shield ring having a center opening through which the movable barrel is movably fitted and a self-centering annular portion provided around the center opening. The self-centering annular portion is in contact with an outer cylindrical surface of the movable barrel and is bent by and along the outer cylindrical surface of the movable barrel. The light shield ring is biased against an annular part of the outer member by a biasing member, so that the light shielding ring is movable in a radial direction when a radial force is applied to the light shielding ring via the movable barrel and the self-centering annular portion.

It is desirable for a portion of the light shield ring, which is positioned radially outside of the self-centering annular portion, to be biased against the annular part of the outer member by the biasing member so that the light shield ring can move in radial directions of the lens.

It is desirable for the light shield member to be made of a flexible sheet material, and for a reinforcing member to be integrally fixed to a portion of the light shield ring excluding at least the self-centering annular portion.

It is desirable for the biasing member to include a ring-shaped spring having a substantially flat shape which resists a compression force thereagainst in the optical axis direction, and for the ring-shaped spring and the light shield ring to be positioned side by side in the optical axis direction so that the ring-shaped spring biases the light shield ring against an interior surface of the annular part of the outer member, the interior surface lying in a plane substantially orthogonal to the optical axis direction.

It is desirable for the movable barrel to include a beveled surface at a front end of the outer peripheral surface of the movable barrel, the self-centering annular portion of the light shield ring being capable of coming in contact with the outer peripheral surface of the movable barrel.

It is desirable for the outer barrel to include a stationary barrel which is immovable with respect to an apparatus body in which the light shielding device is incorporated.

It is desirable for the movable barrel to move in the optical axis direction without rotating with respect to the outer barrel.

It is desirable for the lens to include a cam ring positioned around the movable barrel between the movable barrel and the stationary barrel and driven to rotate about the movable barrel, and for the ring-shaped spring and the light shield ring to be held between the interior surface of the annular part of the outer member and a front end of the cam ring.

It is desirable for the reinforcing member to be formed as a ring shape having an inner diameter greater than an inner diameter of the center opening of the light shield ring.

It is desirable for the outer member to include an outer barrel, and for the outer barrel to include a cover ring fixed at a front end of the outer barrel and including the annular part of the outer member, against which the portion of the light shield ring is biased by the biasing member.

It is desirable for the movable barrel to include a cover ring fixed at a front end of the movable barrel, the beveled surface being formed on the cover ring.

It is desirable for the lens to serve as a photographic lens, the movable barrel supporting at least one lens group.

In an embodiment, a light shielding device of a lens including at least one movable barrel retractable in an optical axis direction is provided, the light shielding device including an outer member positioned around the movable barrel from which the movable barrel advances in the optical axis direction; and a light shield ring, fitted on the movable barrel and positioned inside of the outer member immediately behind a front end of the outer member, for preventing ambient light from entering the lens through a clearance between the movable barrel and the outer member. A self-centering annular portion of the light shield ring is in contact with an outer peripheral surface of the movable barrel. A radially outer portion of the light shield ring which is positioned radially outside of the self-centering annular portion of the light shield ring is biased against a annular part of the outer member by a biasing member, the radially outer portion of the light shield ring and the biasing member being sandwiched between the annular part of the outer member and an internal member provided between the movable barrel and the outer member.

It is desirable for the internal member to be a cam ring.

According to the present invention, the light shield ring is prevented from becoming eccentric to the movable barrel even if the fitting force of the light shield ring exerted on the movable barrel is weakened to reduce loads on a mechanism for moving the movable barrel during operation thereof since the light shield ring is supported at the portion thereof, which is positioned radially outside of the self-centering annular portion of the light shield ring, by the outer member (e.g., an outer barrel or a frame of a camera) via the biasing member. Additionally, even if light shield ring becomes eccentric to the movable barrel, the light shield ring is automatically positioned coaxially with the movable barrel to correct eccentricity of the light shield ring by a configuration allowing the light shield ring to move radially with respect to the movable barrel, whereby the light shield ring is prevented from being pulled out by movements of the movable barrel, thus prevented from being exposed to the outside.

The present disclosure relates to subject matter contained in Japanese Patent Application No. 2005-351433 (filed on Dec. 6, 2005), which is expressly incorporated herein in its entirety.

BRIEF DESCRIPTION OF THE DRAWINGS

The present invention will be discussed below in detail with reference to the accompanying drawings, in which:

FIGS. 5A through 5D are cross sectional views of the portion of the photographic lens shown in FIGS. 3 and 4 in different states, illustrating the motion of a light shield ring and the problem associated with this motion of the light shield ring which may occur by the lens advancing/retracting operation of a movable lens barrel of the photographic lens.

DESCRIPTION OF THE PREFERRED EMBODIMENT

Figure 1:
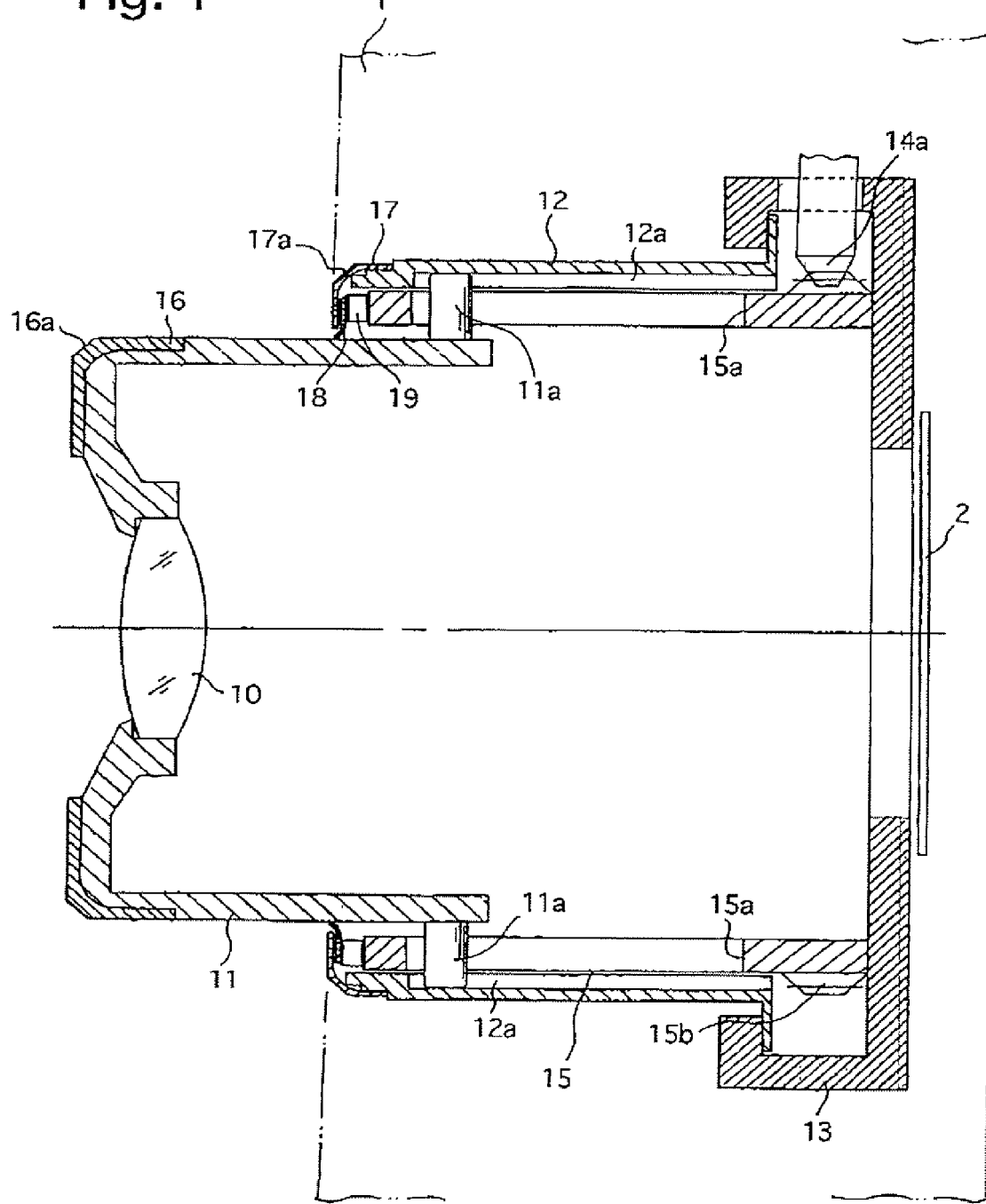
FIG. 1 is a cross sectional view of elements of an embodiment of a photographic lens according to the present invention.

FIG. 1 is a cross sectional view of an embodiment of a retractable photographic lens of a digital camera in which a light shielding device according to the present invention is incorporated. The photographic lens is embedded in a camera body (apparatus body) 1 shown by two-dot chain lines in FIG. 1. The photographic lens is provided with a movable barrel (first barrel/movable lens barrel) 11 which holds a lens group 10, and a stationary barrel (second barrel/outer member) 12 which is positioned around the movable barrel 11 to support the movable barrel 11 in a manner to allow the movable barrel 11 to move forward and rearward linearly without rotating in an optical axis direction (horizontal direction as viewed in FIG. 1). The stationary barrel 12 is fixed at the rear end thereof to a housing 13 formed in an annular frame shape which is positioned inside of the camera body 1. The photographic lens is further provided with a cam ring 15 which is positioned inside the stationary barrel 12 and the housing 13 to extend over the stationary barrel 12 and the housing 13 in the optical axis direction. The movable barrel 11 is inserted in the cam ring 15 to be installed therein. The photographic lens is provided with a light shielding device according to the present invention which is configured and installed in a manner to prevent ambient light from entering the photographic lens through a clearance (radial clearance) between the movable barrel 11 and the stationary barrel 12 at the front end of the stationary barrel 12.

Figure 2:
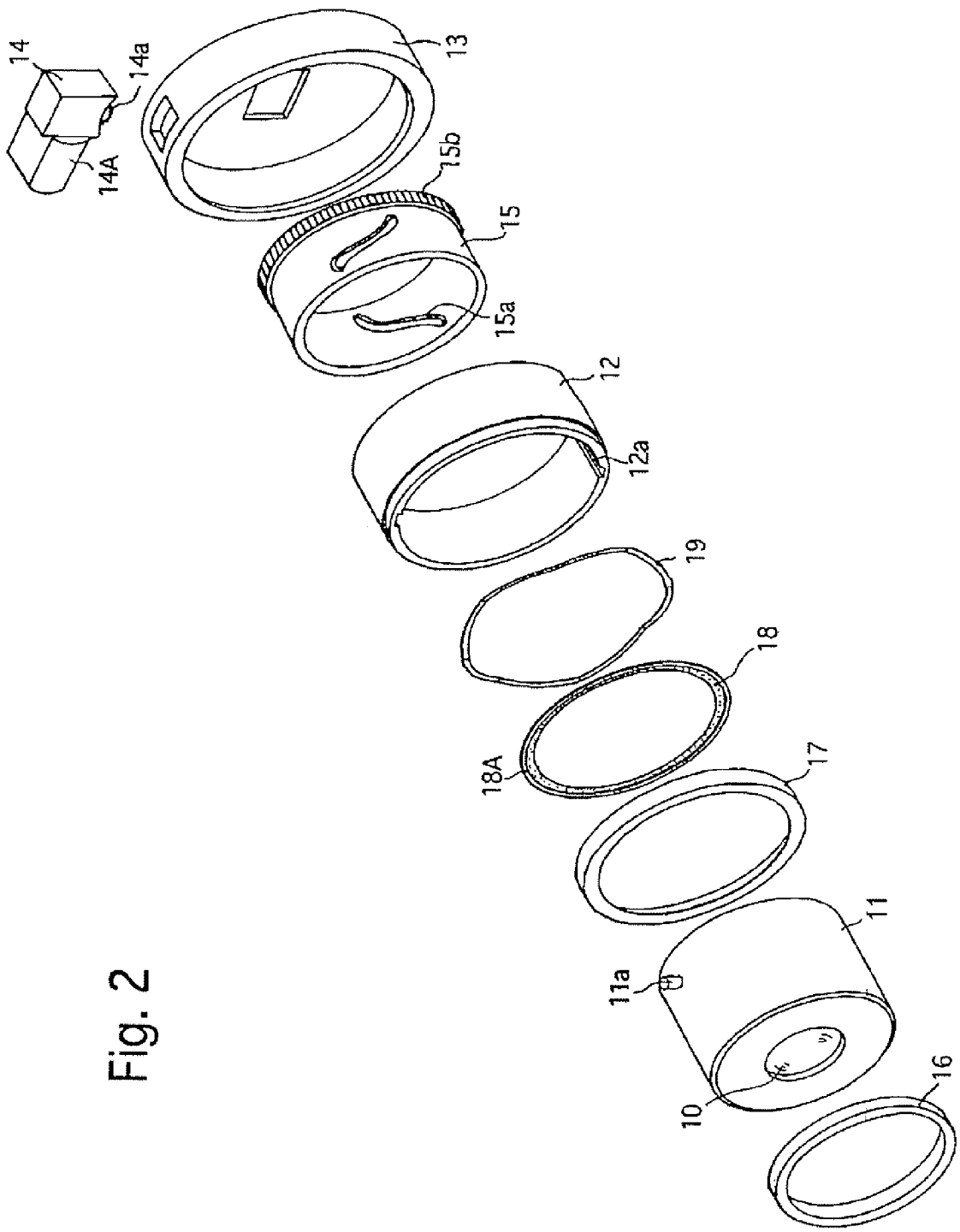
FIG. 2 is an exploded perspective view of the photographic lens shown in FIG. 1.
Figure 3:
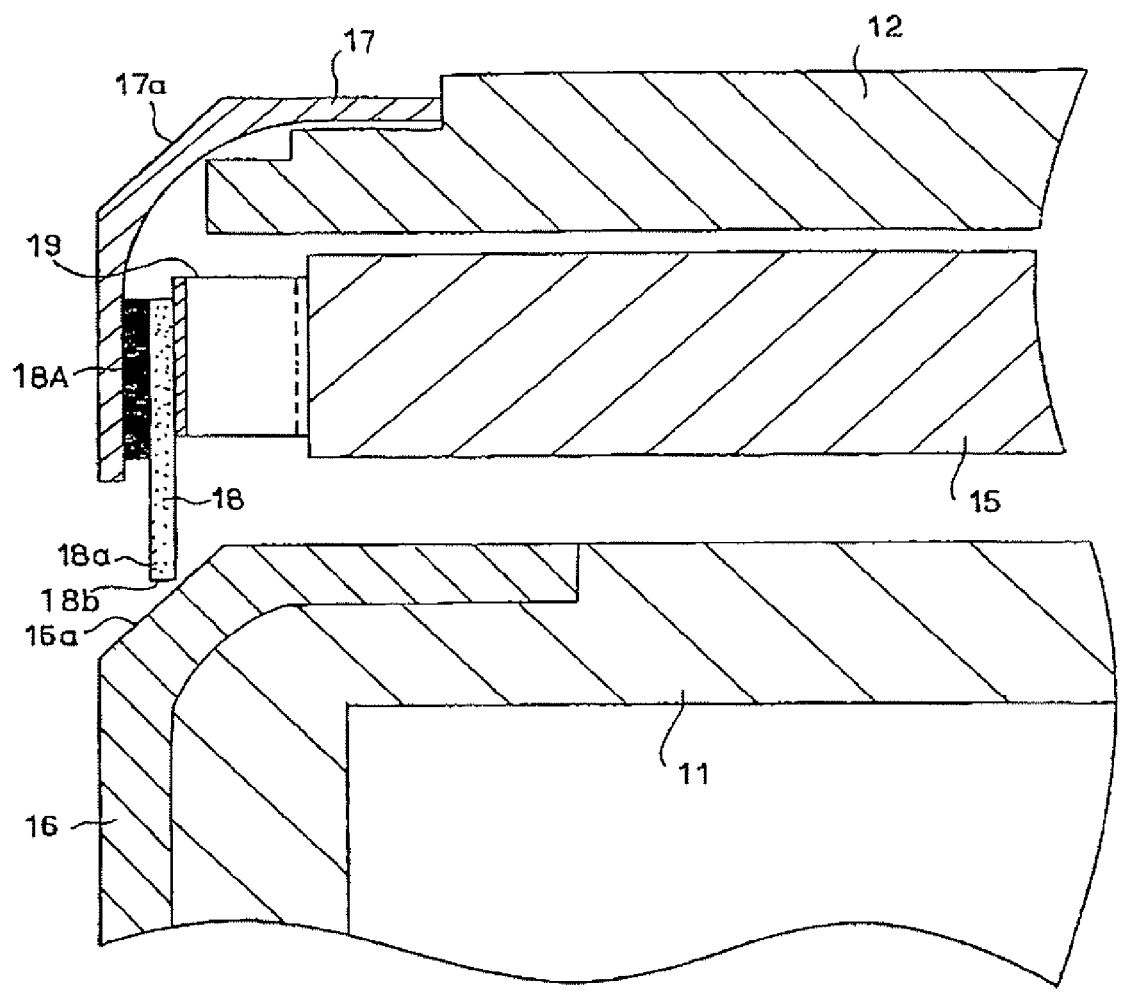
FIG. 3 is a cross sectional view of a portion of the photographic lens shown in FIG. 1.
Figure 4:
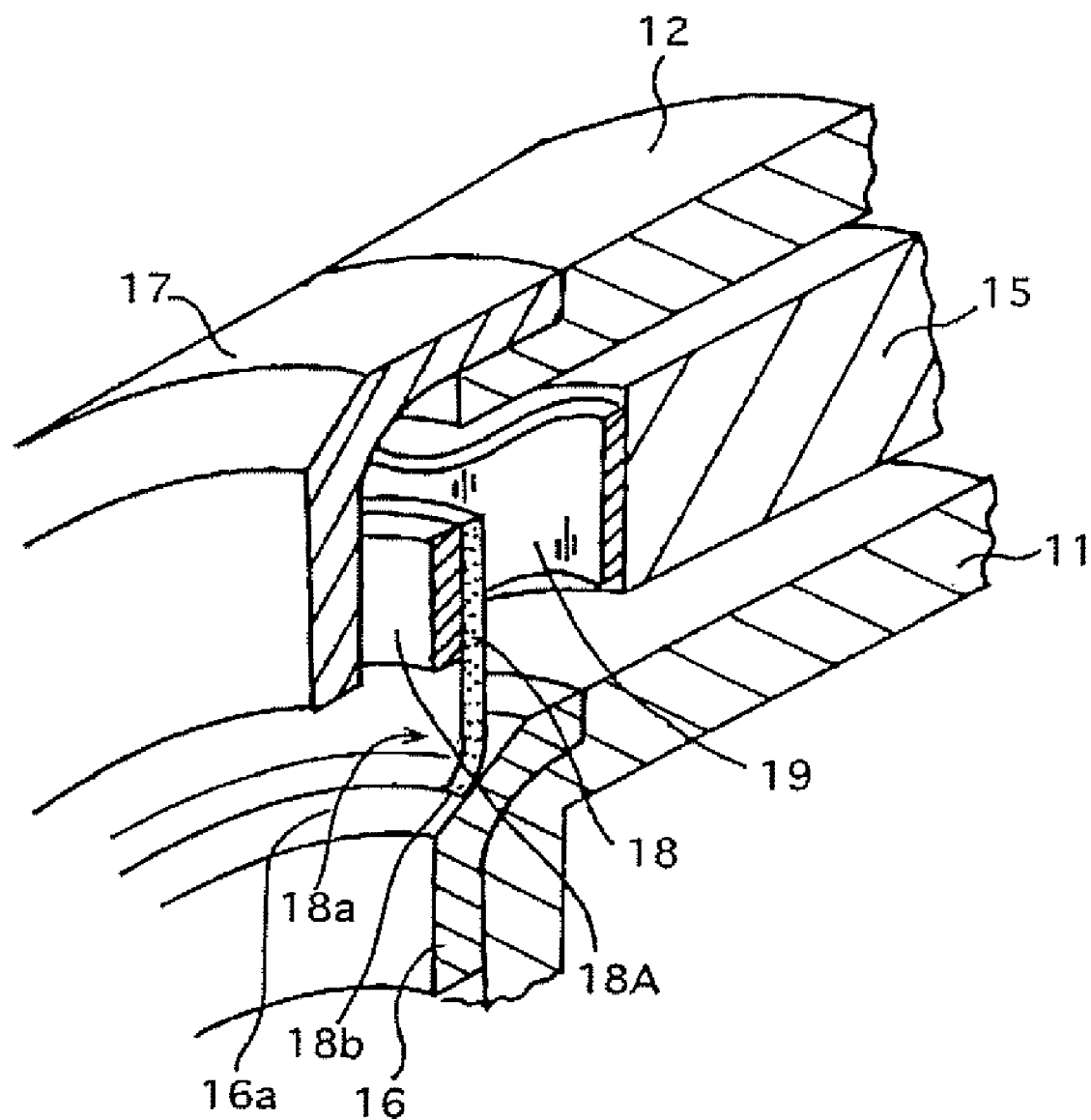
FIG. 4 is a perspective cutaway view of the portion of the photographic lens shown in FIG. 3.

FIG. 2 is an exploded perspective view of elements of the photographic lens, FIG. 3 is a cross sectional view of a portion of the photographic lens in an assembled state, and FIG. 4 is a perspective cutaway view of the portion of the photographic lens shown in FIG. 3. The photographic lens is provided outside of the housing 13 with a gear box 14 having a drive motor 14A (see FIG. 2). The cam ring 15 that is positioned inside the stationary barrel 12 is provided, on an outer peripheral surface thereof at the rear end of this outer peripheral surface, with a circumferential gear 15b, and the drive motor 14A includes an output gear 14a (see FIGS. 1 and 2) which is in mesh with the circumferential gear 15b. The cam ring 15 is provided with a plurality of cam slots 15a having a required shape, and the movable barrel 11 is provided on an outer peripheral surface thereof with a corresponding plurality of cam followers 11a which are engaged in the plurality of cam slots 15a, respectively. The radially outer ends of the plurality of cam followers 11a are engaged in a corresponding plurality of cam grooves 12a, respectively, which are formed on an inner peripheral surface of the stationary barrel 12. Due to this structure, rotation of the drive motor 14A causes the cam ring 15 to rotate, this rotation of the cam ring 15 causes the movable barrel 11 to move in the optical axis direction via the engagement of the plurality of cam grooves 15a with the plurality of cam followers 11a so as to vary the distance from a lens group (an element of a photographic optical system) 10 that is held by the movable barrel 11 to the imaging surface of an image pickup device 2 which is installed in the camera body 1 that is shown in FIG. 1, thereby making the operation (e.g., zooming or focusing operation) of the photographic lens possible.

The movable barrel 11 is provided at the front end thereof with a first cover ring 16 which is fitted on the front end of the movable barrel 11 to be fixed thereto by an adhesive or a screw structure. The first cover ring 16 also serves a decorative member and covers a front end face of the movable barrel 11 and an adjacent outer peripheral surface of the movable barrel 11 around the lens group 10. Similarly, the stationary barrel 12 is provided at the front end thereof with a second cover ring (annular part) 17 which is fitted on the front end of the stationary barrel 12 to be fixed thereto by an adhesive or a screw structure. The second cover ring 17 also serves a decorative member and covers the front end of the stationary barrel 12 and an adjacent outer peripheral surface of the stationary barrel 12. Due to this structure, the second cover ring 17 also covers the front end of the cam ring 15 that is provided inside the stationary barrel 12, and simultaneously secures an axial gap having a required length in the optical axis direction between an inner surface of the second cover ring 17 and the front end face of the cam ring 15. In this gap, a light shield ring (ring-shaped light shield member) 18 is installed together with a ring spring 19 serving as a biasing member. The light shielding ring 18 is provided with a circular center opening 18b through which the movable barrel 16 is fitted so that a self-centering annular portion 18a around the circular opening 18b is bent by outer cylindrical surface of the movable barrel 16. Although the movable barrel 11 does not have to be provided with the first cover ring 16, the stationary barrel 12 must be provided with the second cover ring 17 to form the aforementioned axial gap in the optical axis direction in which the light shield ring 18 and the ring spring 19 are installed. Although the first cover ring 16 and the second cover ring 17 are provided on outer peripheral surfaces thereof with a beveled surface 16a and a beveled surface 17a, respectively, each of which is inclined with respect to a radial direction of the photographic lens, the second cover ring 17 does not have to be provided with the beveled surface 17a in the case where the second cover ring 17 is fully embedded in a camera body like the camera body 1 shown in FIG. 1 (e.g., in the case where the front end face of the second cover ring 17 is flush with a front surface of the camera body 1). As shown in FIG. 3, the radially outer edge of the beveled surface (chamfered surface) 16a of the first cover ring 16 is positioned either in contact with or slightly behind the self-centering annular portion 18a of the light shield ring 18 when the movable barrel 11 is fully retracted in the stationary barrel 12. In other words, the radially outer end of the cover ring 16 at the front end thereof is beveled to be formed as the beveled surface 16a so as not to be in contact with the self-centering annular portion 18a of the light shield ring 18 when the movable barrel 11 is fully retracted in the stationary barrel 12. Shortly after the movable barrel 11 starts advancing in the optical axis direction from the stationary barrel 12 from the fully retracted state of the movable barrel 11 (from the state shown in FIG. 3), the beveled surface 16a comes in contact with the self-centering annular portion 18a of the light shield ring 18.

The light shield ring 18 is made of an opaque resilient member having flexibility with a certain degree of stiffness, e.g., a thin sheet of rubber or synthetic material, and is formed in a ring shape. The inner diameter of the circular opening 18b of the light shield ring 18 is slightly smaller than the outer diameter of the movable barrel 11 so that the self-centering annular portion 18a can be in sliding contact with the outer peripheral surface of the movable barrel 11 while being resiliently deformed. The outer diameter of the light shield ring 18 is greater than at least the inner diameter of the cam ring 15, and is slightly smaller than the outer diameter of the cam ring 15 in this particular embodiment. A reinforcing member 18A in the shape of a ring is fixed to a front surface of the light shield member 18 around and excluding the self-centering annular portion 18a of the light shield ring 18 to be is integral therewith. The reinforcing member 18A is slightly greater in stiffness than the light shield ring 18.

The ring spring 19 is made of a spring metal plate which is shaped as a ring, and is bent forward and rearward in the optical axis direction at a plurality of portions of the ring spring 19 in a circumferential direction to produce a spring force when compressed in the optical axis direction. The inner diameter of the ring spring 19 is greater than the inner diameter of the cam ring 15. The outer diameter of the ring spring 19 is smaller than the outer diameter of the cam ring 15. The ring spring 19 is installed between the light shield ring 18 and the front end of the cam ring 15 so that the aforementioned plurality of bent portions of the ring spring 19 are in elastic contact with the light shield ring 18 to make the reinforcing member 18A, which is fixed to a front surface of the light shield ring 18, pressed against an inner surface (interior surf ace) of the second cover ring 17, which lies in a plane substantially orthogonal to the optical axis direction, via the light shield ring 18 in the optical axis direction. Specifically, the ring spring 19 is in elastic contact with an interior surface (back surface) of the light shield ring 18, thereby bringing the reinforcing member 18A into elastic contact with the aforementioned inner surface (interior surface) of the second cover ring 17. The spring force (biasing force) of the ring spring 19 is predetermined to a degree which allows the light shield ring 18, which is biased against the aforementioned inner surface of the second cover ring 17 via the reinforcing member 18A by the ring spring 19, to move slidingly on the aforementioned inner surface of the second cover ring 17 while preventing the light shield ring 18 from tilting with respect to the optical axis direction due to being deformed excessively by the ring spring 19.

According to this configuration, the light shield ring 18 does not have to be bonded to either the stationary barrel 12 or the cam ring 15; it is only necessary to install the light shield ring 18 together with the ring spring 19 immediately in front of the front end of the cam ring 15 and to fit the second cover ring 17 on the stationary barrel 12 from the outside thereof so that the light shield ring 18 and the ring spring 19 are sandwiched between the front end of the cam ring 15 and the second cover ring 17, which facilitates the assembling procedure of the photographic lens. The second cover ring 17 is fitted on the stationary barrel 12 when the movable barrel 11 is fully retracted to be positioned at the rear end position thereof in the optical axis direction as shown in FIG. 5A. In this state shown in FIG. 5A, the self-centering annular portion 18*a* of the light shield ring 18 is either in contact with or positioned in close vicinity of the beveled surface 16*a* of the first cover ring 16 to cover the clearance between the movable barrel 11 and the stationary barrel 12 to thereby prevent ambient light from entering the photographic lens through the clearance. Additionally, when the movable barrel 11 advances from the stationary barrel 12 as shown in FIG. 5B, the self-centering annular portion 18*a* of the light shield ring 18 comes into elastic contact with the outer peripheral surface of the movable barrel 11 in a deformed state, so that the light shield ring 18 securely covers the clearance between the movable barrel 11 and the stationary barrel 12, thus preventing ambient light from entering the photographic lens through the clearance.

In the case where the light shield ring 18 becomes eccentric to the movable barrel 11, the contacting area of the self-centering annular portion 18*a* of the light shield ring 18 which is in contact with the outer peripheral surface of the movable barrel 11 increases at a portion of the self-centering annular portion 18*a* which is decentered radially inwards. For instance, in either of the following two cases: the case where the light shield ring 18 further advances from the state shown in FIG. 5B as shown in FIG. 5C and the case where the light shield ring 18 retracts in a retracting direction (rightward as viewed in FIGS. 5A through 5D) as shown in FIG. 5D, the aforementioned contacting area of the self-centering annular portion 18*a* of the light shield ring 18 also increases to thereby increase the contact friction between the light shield ring 18 and the movable barrel 11, so that there is a concern that the load on a lens drive mechanism (which includes the drive motor 14A and the output gear 14*a*) for driving the movable barrel 11 may increase during the lens advancing/retracting operation of the movable barrel 11. In addition, there is a concern that the light shield ring 18 may be partly pulled out to be exposed to the outside of the second cover ring 17 as shown in FIG. 5C to thereby deteriorate the outward appearance of the photographic lens, especially when the movable barrel 11 advances. Additionally, there is concern of a possibility of a gap being created between the circular center opening 18*b* and the outer peripheral surface of the movable barrel 11 at a circumferential position which is decentered radially outwards with respect to the movable barrel 11, thereby deteriorating the light shielding effect of the light shield ring 1. However, in the present embodiment of the photographic lens, even if the light shield ring 18 becomes eccentric, this eccentricity is automatically corrected via the self-centering annular portion 18*a* and the movable barrel 11 so that the light shield ring 18 is positioned coaxially (concentrically) with the movable barrel 11.

Figure 6A:
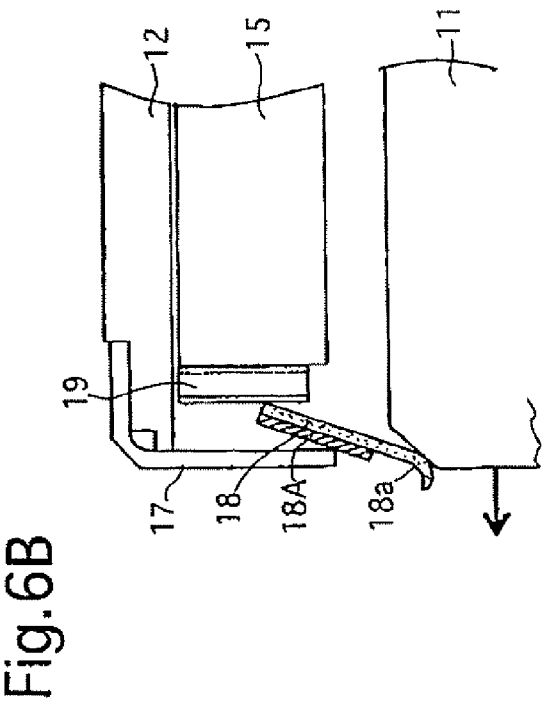
FIGS. 6A through 6D are cross sectional views of the portion of the photographic lens shown in FIGS. 3 and 4 in different states, illustrating the principle of a self-centering operation of the light shield ring.
Figure 6B:
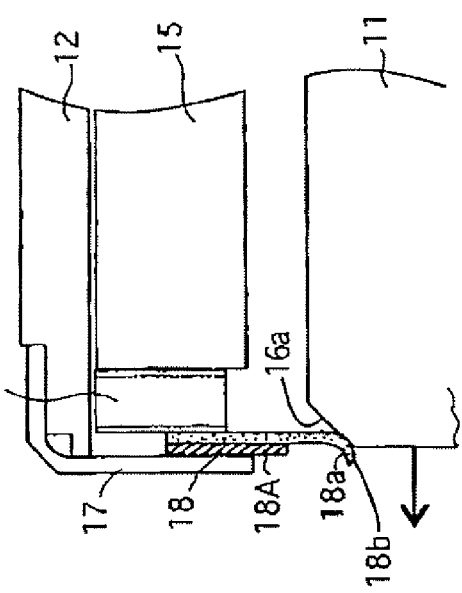
Figure 6C:
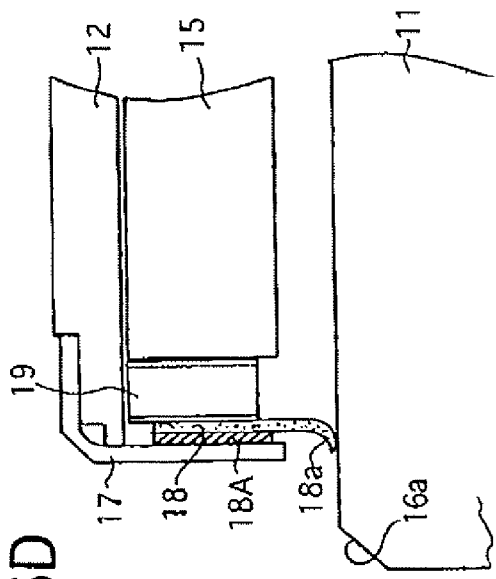
Figure 6D:
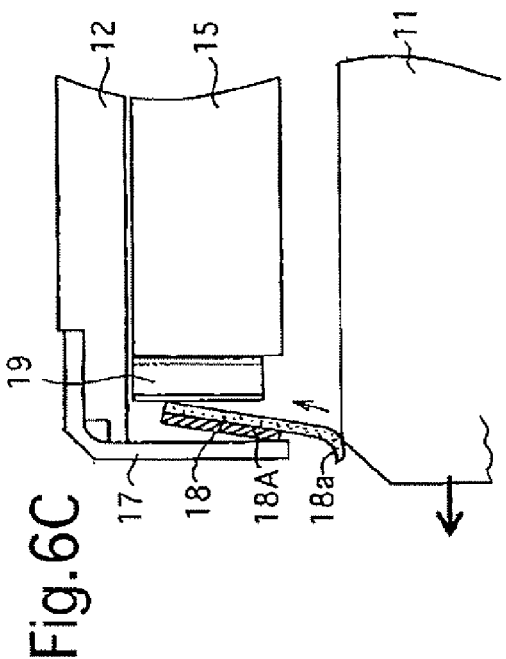

FIGS. 6A through 6D illustrate the principle of such a self-centering operation of the light shield ring 18. The state shown in FIG. 6A is the same as the state shown in FIG. 5A except that the light shield ring 18 is eccentric to the movable barrel 11 (specifically the light shield ring 18 is decentered radially downwards as viewed in FIG. 6A) In the state shown in FIG. 6A, the self-centering annular portion 18*a* of the light shield ring 18 is in elastic contact with the beveled surface 16*a* of the first cover ring 16 and slightly deformed thereby. From this initial state (fully retracted state) of the photographic lens, a forward movement of the movable barrel 11 causes the self-centering annular portion 18*a* of the light shield ring 18 to move forward, which causes the reinforcing member 18A to be inclined along the beveled surface 16*a* of the first cover ring 16 while causing the ring spring 19 to compress by the leverage caused by the reinforcing member 18A with the radially inner edge of the second cover ring 17 serving as a fulcrum as shown in FIG. 6B. A further forward movement of the movable barrel 11 causes the self-centering annular portion 18*a* to move from the beveled surface 16*a* onto the outer peripheral surface of the movable barrel 11, thereby reducing the force exerted on the self-centering annular portion 18*a* by the movable barrel 11 to move the self-centering annular portion 18*a* forward. Thereupon, the light shield ring 18 starts returning to its initial position (non-decentered position) by the spring force of the ring spring 19. Thereafter, the self-centering annular portion 18*a* of the light shield ring 18 returns to the initial position thereof upon coming into contact with the outer peripheral surface of the movable barrel 11 as shown in FIG. 6D. At this time, the light shield ring 18 is also moved radially, which causes the light shield ring 18 to return to the initial position thereof automatically, i.e., to be aligned automatically with the movable barrel 11, to thereby complete a correction of the eccentricity of the light shield ring 18. Upon the correction of this eccentricity, the light shield ring 18 is held in the position thus adjusted (coaxial position) by the ring spring 19. In this manner, by moving the movable barrel 11 forward and rearward at least once, the light shield ring 18 is automatically positioned coaxially with the movable barrel 11. Since this self-centering operation of the light shield ring 18 is also performed upon the completion of assembly of the photographic lens, an operation for adjusting the light shield ring 18 coaxially with the movable barrel 11 during assembly of the photographic lens is no longer necessary, which facilitates the assembling procedure of the photographic lens. Accordingly, the aforementioned problem of an increase of the contact friction between the light shield ring 18 and the movable barrel 11 and also the aforementioned problem of a deterioration of the light shielding effect of the light shield ring 18, which may occur with an eccentricity of the light shield ring 18, can be prevented from occurring.

In other words, the force of the ring spring 19 and the friction between the light shield ring 18 and the inner surface of the second cover ring 17 are set so that the shield ring 18 can move in a radial direction via the sliding engagement of the self-centering annular portion 18a and the movable barrel 11.

Even after an eccentricity of the light shield ring 18 has been corrected in this manner, there is a possibility of the self-centering annular portion 18a of the light shield ring 18 being pulled out of its initial position to extend forward or rearward (outward or inward) in the forward or rearward directions of the movable barrel 11 as shown in FIGS. 5C and 5D, respectively, by the contact friction between the self-centering annular portion 18a of the light shield ring 18 and the outer peripheral surface of the movable barrel 11. Nevertheless, since the reinforcing member 18A prevents at least a portion of the light shield ring 18 (to which the reinforcing member 18A is attached) from being deformed, the amount by which the light shield ring 18 is pulled outward or inward due to a deformation thereof can be minimized, and accordingly, the light shielding effect of the light shield ring 18 is maintained. Additionally, since a certain amount of contact friction occurs between the light shield ring 18 and the outer peripheral surface of the movable barrel 11 when the movable barrel 11 moves in the optical axis direction, this contact friction becomes a burden on the aforementioned lens drive mechanism for driving the movable barrel 11 during the lens advancing/retracting operation of the movable barrel 11. However, this contact friction is minimized since the light shield ring 18 is made of a thin flexible material and also since the light shield ring 18 is fitted on the outer peripheral surface of the light shield ring 18 with a weak fitting force. Moreover, since the light shield ring 18 is held simply by making the light shield ring 18 (specifically the reinforcing member 18A that is adhered to the light shield ring 18) be in elastic contact with an inner surface (interior surf ace) of the second cover ring 17 by the ring spring 19 while being allowed to move radially with respect to the movable barrel 11, the light shield ring 18 can follow movements of the movable barrel 11 while slightly moving radially by the contact friction between the self-centering annular portion 18a of the light shield ring 18 and the outer peripheral surface of the movable barrel 11 when the movable barrel 11 moves in the optical axis direction relative to the stationary barrel 12. In this regard also, the burden on the aforementioned lens drive mechanism for driving the movable barrel 11 during the lens advancing/retracting operation of the movable barrel 11 is minimized Although the reinforcing member 18A does not have to be provided if the light shield ring 18 itself has a sufficient stiffness, it is desirable to provide the light shield ring 18 with flexibility and fix the reinforcing member 18A to the light shield ring 18 as described above if the fitting force of the light shield ring 18 exerted on the outer peripheral surface of the movable barrel 11 is to be weakened. In addition, it is possible to improve the stiffness of a radially outer portion of the light shield ring 18 by processing or treating this radially outer portion physically or chemically instead of fixing the reinforcing member 18A to the light shield ring 18.

Although in the above illustrated embodiment of the photographic lens the stationary barrel 12 serves as an outer barrel of the photographic lens in which the movable barrel 11 moves in the optical axis direction, the present invention can also be applied to another type of photographic lens such as disclosed in JLPP No. 2001-337257, in which a single movable barrel which is positioned in a circular frame provided on a camera body moves in an optical axis direction relative to the circular frame. In this case, a light shield ring corresponding to the light shield ring 18 can be made to be in elastic contact with an inner wall (interior surface) of the aforementioned circular frame by a spring member corresponding to the ring spring 19.

Although the ring spring 19 has a ring shape in the above illustrated embodiment, any other spring having a different shape can be adopted instead of the ring spring 19 as long as the spring has the capability of biasing the light shield ring against the second cover ring. For instance a coil spring made of a minute-diameter spring wire can be used instead. Alternatively, a spring member including a plurality of spring tongues can be fixed integrally with a front end face of a linearly movable barrel so that the plurality of spring tongues are elongated along a circumferential direction of the linearly movable barrel.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A light shielding device of a lens, comprising:
    a movable barrel which moves in an optical axis direction;
    an outer member positioned around said movable barrel; and
    a light shield ring for preventing ambient light from entering said lens through a clearance between said movable barrel and said outer member, said light shield ring having a center opening through which said movable barrel is movably fitted and a self-centering annular portion provided around said center opening,
    wherein said self-centering annular portion is in contact with an outer cylindrical surface of said movable barrel and is bent by and along the outer cylindrical surface of the movable barrel, and
    wherein said light shield ring is biased against an annular part of said outer member by a biasing member, so that said light shielding ring is movable in a radial direction when a radial force is applied to said light shielding ring via said movable barrel and said self-centering annular portion.

2. The light shielding device according to claim 1, wherein a portion of said light shield ring, which is positioned radially outside of said self-centering annular portion, is biased against said annular part of said outer member by said biasing member so that said light shield ring can move in radial directions of said lens.

3. The light shielding device according to claim 1, wherein said light shield member is made of a flexible sheet material, and
    wherein a reinforcing member is integrally fixed to a portion of said light shield ring excluding at least said self-centering annular portion.

4. The light shielding device according to claim 3, wherein said reinforcing member is formed as a ring shape having an inner diameter greater than an inner diameter of said center opening of said light shield ring.

5. The light shielding device according to claim 1, wherein said biasing member comprises a ring-shaped spring having a substantially flat shape which resists a compression force there against in said optical axis direction, and
    wherein said ring-shaped spring and said light shield ring are positioned side by side in said optical axis direction so that said ring-shaped spring biases said light shield ring against an interior surface of said annular part of said outer member, said interior surface lying in a plane substantially orthogonal to said optical axis direction.

6. The light shielding device according to claim 5, wherein said lens comprises a cam ring positioned around said movable barrel between said movable barrel and said stationary barrel and driven to rotate about said movable barrel, and wherein said ring-shaped spring and said light shield ring are held between said interior surface of said annular part of said outer member and a front end of said cam ring.

7. The light shielding device according to claim 1, wherein said movable barrel comprises a beveled surface at a front end of said outer peripheral surface of said movable barrel, said self-centering annular portion of said light shield ring being capable of coming in contact with said outer peripheral surface of said movable barrel.

8. The light Shielding device according to claim 7, wherein said movable barrel comprises a cover ring fixed at a front end of said movable barrel, said beveled surface being formed on said cover ring.

9. The light shielding device according to claim 1, wherein said outer barrel comprises a stationary barrel which is immovable with respect to an apparatus body in which said light shielding device is incorporated.

10. The light shielding device according to claim 1, wherein said movable barrel moves in said optical axis direction without rotating with respect to said outer barrel.

11. The light shielding device according to claim 1, wherein said outer member comprises an outer barrel, and wherein said outer barrel comprises a cover ring fixed at a front end of said outer barrel and including said annular part of said outer member, against which said portion of said light shield ring is biased by said biasing member.

12. The light shielding device according to claim 1, wherein said lens serves as a photographic lens, said movable barrel supporting at least one lens group.

13. A light shielding device of a lens including at least one movable barrel retractable in an optical axis direction, said light shielding device comprising:

an outer member positioned around said movable barrel from which said movable barrel advances in said optical axis direction; and a light shield ring, fitted on said movable barrel and positioned inside of said outer member immediately behind a front end of said outer member, for preventing ambient light from entering said lens through a clearance between said movable barrel and said outer member, wherein a self-centering annular portion of said light shield ring is in contact with an outer peripheral surface of said movable barrel, and wherein a radially outer portion of said light shield ring which is positioned radially outside of said self-centering annular portion of said light shield ring is biased against a annular part of said outer member by a biasing member, said radially outer portion of said light shield ring and said biasing member being sandwiched between said annular part of said outer member and an internal member provided between said movable barrel and said outer member.

14. The light shielding device according to claim 13, wherein said internal member comprises a cam ring.

* * * * *